2,835,686

ORGANOMETALLIC COMPOUNDS CONTAINING CYCLOPENTADIENYL NUCLEI BONDED DIRECTLY TO A GROUP VIII METAL AND TO A GROUP I OR A GROUP II METAL

Peter J. Graham, Wilmington, Del., assignor to E. I. du Pont de Nemours and Company, Wilmington, Del., a corporation of Delaware No Drawing. Application November 12, 1953
Serial No. 391,723

25 Claims. (Cl. 260—429)

This invention relates to new organometallic derivatives of group VIII metals and to their preparation. More particularly, this invention relates to new organometallic derivatives which contain two unsaturated carbocyclic hydrocarbon radicals and have two different metals attached to carbon thereof, one of the metals being from group VIII and the other metal from groups I to II of the periodic table.

Organometallic compounds, i. e., compounds wherein the metal atom is bonded directly to carbon of organic radicals, have found utility in catalytic and synthetic processes. For example, tetraethyllead is used as an antiknock agent in spark ignition engines; organomercury compounds are used in the fungicide field, particularly as seed disinfectants; and organomagnesium, organosodium and organolithium compounds are used in organic syntheses.

Recently there has been disclosed a compound having two cyclopentadienyl radicals directly attached to an iron atom as described by Kealy and Pauson, Nature 168, 1039 (1951) and claimed by Pauson in U. S. patent application Serial No. 291,567, filed June 3, 1952, now U. S. Patent No. 2,680,736, issued June 8, 1954. This compound has been considered unique in that, according to Wilkinson et al. in J. Am. Chem. Soc. 74, 2125 (1952), all five positions of the cyclopentadiene ring in dicyclopentadienyl metallics are equivalent and no isomerism with respect to any one cyclopentadiene ring is possible. Other group VIII organometallics of cyclopentadiene have been reported. For example, the cobalt compound has been prepared by Wilkinson, J. Am. Chem. Soc. 74, 6146–9 (1952), and the nickel derivative is the subject of U. S. patent application to Thomas, Serial No. 298,170, filed July 10, 1952, now U. S. Patent No. 2,680,758, issued June 8, 1954. Wilkinson has also reported the preparation of corresponding dicyclopentadienyl derivatives of ruthenium, rhodium, iridium, and palladium. In these organometallic compounds of the group VIII elements, there are two cyclopentadienyl radicals directly linked through carbon thereof to the metal atom. Many investigators have attempted to explain the unusual stability of these compounds as due not only to the particular type of organic radical bonded to the metal, but also as due to the fact that there are two identical radicals so linked.

Although organic groups have been substituted for hydrogen of the carbocyclic rings, the derivatives obtainable have been somewhat limited. Organometallic compounds are generally quite useful in the preparation of other organic compounds due to their reactivity.

It is an object of this invention to provide a new class of organometallic compounds and methods for their preparation. A further object is to provide new organometallic compounds which contain two unsaturated carbocyclic hydrocarbon radicals and have two different metals attached to carbon thereof, one of said metals being from group VIII and the other of said metals being from groups I to II of the periodic table. Other objects will appear hereinafter.

These objects are accomplished in accordance with the present invention by providing organometallic compounds wherein a metal of group VIII of the periodic table is bonded directly to nuclear carbon of two five-membered carbocyclic radicals which are entirely hydrocarbon and each of which contains the cyclopentadiene ring as its nucleus and wherein at least one of the carbocyclic radicals also is bonded directly through nuclear carbon thereof to a metal atom of not higher than group II of the periodic table.

In a preferred embodiment of this invention the group VIII metal is bonded directly to nuclear carbon of two unsubstituted cyclopentadienyl radicals and at least one of the cyclopentadienyl radicals has bonded directly to a ring carbon thereof a metal atom from groups I to II of the periodic table.

The compounds included in this invention have the formula

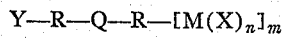

$$Y-R-Q-R-[M(X)_n]_m$$

in which R is a carbocyclic radical as heretofore defined, Q is a group VIII metal, M is a group I to II metal whose atomic number preferably does not exceed 80, X is an anion, $n$ is the valence of M less 1, $m$ is at least 1 and less than 5, generally not more than 3, and Y is hydrogen or $[M(X)_n]_m$. The preferred class of compounds of this invention are those in which the metal Q is of the first period of group VIII and in particular iron, the carbocyclic radical is the unsubstituted cyclopentadienyl radical, and the metal M attached to one or both of the rings is not higher than group II of the periodic table.

The compounds of this invention are generally prepared by metallation of a group VIII organometallic, with a reagent capable of yielding organometallic compounds, e. g., by the action of dicyclopentadienyliron with an alkali metal alkyl or with a mercurating agent.

The following examples, in which the parts are by weight, illustrate specific embodiments of the preparation of new compounds of this invention.

*Example 1*

Approximately 8.75 parts (corresponding to a molar ratio of 0.093) of amylsodium suspension in 62.6 parts of pentane was forced under nitrogen gas pressure into a flask, equipped with a high-speed stirrer, dropping funnel, reflux condenser, and thermometer. With rapid agitation a solution of 8.6 parts (0.046 molar ratio) of dicyclopentadienyliron in 187 parts of dry pentane was added rapidly from the dropping funnel. The reaction temperature increased slowly from 20 to 30° C. and was held in the range 25–30° C. for 4½ hours by external cooling. The reaction mixture containing the sodium derivative of dicyclopentadienyliron, and particularly bis(sodiocyclopentadienyl)iron, which also can be and preferably is named bis(sodiumcyclopentadienyl)iron, was forced under nitrogen pressure through an exit tube to a beaker containing Dry Ice. The mixture was allowed to warm slowly to room temperature and the solvent evaporated in the hood.

The dry residue was extracted once with 100 parts of boiling water and once with a hot mixture of 50 parts of water and 5 parts of sodium carbonate. After this extraction, 5.4 parts of unreacted dicyclopentadienyliron remained. The extracts were filtered and acidified; the yellow precipitate obtained was filtered, washed, and air dried to give 2.7 parts of a tan powder. Recrystallization of this powder from 95% ethanol gave approximately 0.1 part of dark red crystals, M. P. 215–235° C. with sublimation. This product was purified by sublimation at 180–200° C. and 0.5 mm. pressure during a 60-hour period in a microsublimer to give 0.05 part of product shown to be bis(carboxycyclopentadienyl)iron.

*Analysis.*—Calcd. for $C_{12}H_{10}O_4Fe$: C, 52.48; H, 3.68; Fe, 20.37. Found: C, 52.47; H, 3.75; Fe, 19.33.

The bis(carboxycyclopentadienyl)iron prepared in this reaction showed an infrared spectrum identical with the dicarboxylic acid obtained by oxidation of the diacetyl derivative described by Woodward (J. Am. Chem. Soc. 74, 3458 (1952)). Other noncrystalline organoiron compounds containing carboxylic acid groups were isolated by concentration of the alcoholic mother liquor.

*Example II*

A refluxing solution of 37.2 parts (0.2 molar ratio) of dicyclopentadienyliron in 600 parts of 95% ethanol was treated with 64 parts (0.2 molar ratio) of mercuric acetate added portionwise during a 1.3-hour period. The reaction mixture was refluxed for 1 hour and then distilled until about 320 parts of the ethanol was removed. The remaining solution was filtered hot and the clear filtrate cooled in an ice bath. A large amount of light yellow solid separated and this was filtered and washed with about 15 parts of cold ethanol. After air drying at room temperature, this yellow powder weighed 62.7 parts. After vacuum sublimation to remove unreacted dicyclopentadienyliron, 56.8 parts of a yellow powder, M. P. 108–115° C., was obtained which was acetoxymercuricyclopentadienyl(cyclopentadienyl)iron.

*Analysis.*—Calcd. for $C_{12}H_{12}FeHgO_2$: C, 32.41; H, 2.72; Fe, 12.56; Hg, 45.11. Found, C, 29.10; H, 2.63; Fe, 12.56; Hg, 43.83.

Dilution of the remaining filtrate with 500 parts of ice and water gave more yellow precipitate that amounted to 23.3 parts after filtration and air drying. After vacuum sublimation to remove unreacted dicyclopentadienyliron, 14.7 parts of a yellow powder was obtained melting at 94–102° C. This product had the analysis: carbon, 32.37%; hydrogen, 2.95%; iron, 13.22%; and mercury, 44.26%, corresponding to acetoxymercuricyclopentadienyl(cyclopentadienyl)iron.

From the original filtration of the hot reaction mixture, there was obtained 8.3 parts of insoluble yellow powder which had no melting point and was insoluble in numerous organic solvents. It was purified by vacuum sublimation to remove any unreacted dicyclopentadienyliron, the residue being bis(acetoxymercuricyclopentadienyl)-iron.

*Analysis.*—Calcd. for $C_{14}H_{14}FeHg_2O_4$: C, 23.90; H, 2.01; Fe, 7.94; Hg, 57.04. Found: C, 23.83; H, 2.31; Fe, 7.77; Hg, 56.99.

It will be understood that the above examples are merely illustrative and that the invention broadly comprises the production of organometallic compounds in which a group VIII metal is directly bonded to each of two carbocyclic hydrocarbon radicals through nuclear or ring carbon of a cyclopentadiene ring with at least one other metal of groups I to II bonded to a nuclear carbon of at least one of the rings. Although the cyclopentadienyl radical is particularly suited for reasons of availability and reactivity, this invention is not limited to this particular radical. Monovalent carbocyclic hydrocarbon radicals containing the cyclopentadiene ring which have hydrocarbon substituents on the cyclopentadiene ring are also useful. Examples of such hydrocarbon-substituted cyclopentadienes are 1,3-diphenylcyclopentadiene and dimethylcyclopentadiene. Polycyclic compounds such as indene, 2-phenylindene and 1,3-dimethylindene can also be used.

The compounds employed should have hydrocarbon substituents on no more than four of the nuclear carbons, since the metal group is to occupy at least one position on at least one of the rings. It is preferred that the five-membered carbocyclic hydrocarbon radical be the unsubstituted cyclopentadienyl radical or a hydrocarbon-substituted cyclopentadienyl radical having at most two monovalent hydrocarbon substituents, preferably aliphatically saturated, and most preferably lower alkyl groups.

The organometallic compounds of this invention have two different metals attached to nuclear carbon of the cyclopentadiene ring of carbocyclic hydrocarbon groups as previously defined. They are included in the general formula

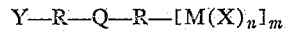

$$Y—R—Q—R—[M(X)_n]_m$$

in which R is the carbocyclic hydrocarbon radical, Q is a group VIII metal, M is a group I to II metal whose atomic number preferably does not exceed 80, X is an anion, $n$ is one less than the valence of the metal M, $m$ is at least one and less than 5, and generally not more than 3, and Y is hydrogen or $[M(X)_n]_m$.

As illustrative of compounds of this formula, Example I shows the preparation and use of bis(sodiocyclopentadienyl)iron for which in the above general formula M is sodium, the value of $n$ is 0, $m$ is 1, and Y is $[M(X)_n]_m$ or Na. Example II shows compounds where X is $OOCCH_3$, M is Hg, $n$ and $m$ are 1, and Y is H in the case of the monomercurated product and is $[M(X)_n]_m$ in the case of the dimercurated product. In addition to these products, others are obtained in which at least one of the cyclopentadiene rings has more than one mercury group.

The acetoxy anion can be converted to other anions, e. g., inorganic anions such as chlorine, bromine, sulfate, nitrate, etc., by conventional replacement reactions. The replacement of acetoxy by chloride or bromide is generally conducted by treatment of the acetoxy compound with alcoholic calcium chloride or bromide.

The alkali metal derivatives of this invention include the compounds of the formula

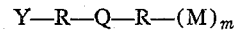

$$Y—R—Q—R—(M)_m$$

where R and Q are defined as aforesaid, M is an alkali metal including lithium, sodium, and potassium and Y is H or $(M)_m$ and $m$ is an integer of at least one and generally not more than three. Compounds thus included are cyclopentadienyl(lithiumcyclopentadienyl)-iron, bis(sodiummethylcyclopentadienyl)iron, bis(potassiumcyclopentadienyl)iron, and bis(disodiumcyclopentadienyl)nickel. Since the alkali metals have a valence of one which is bonded to a cyclic carbon, no anion is attached. These compounds are obtained by reaction of an alkali metal alkyl with a group VIII organometallic, such as dicyclopentadienyliron or nickel.

For group II, the organometallics are ionic and the remaining valences of the group II metal atom are bonded to anions, particularly acetoxy and inorganic anions such as halogen. Compounds of group II which are within the scope of this invention include bis(chloromagnesiumcyclopentadienyl)iron, bis(iodocalciumcyclopentadienyl)-nickel, and the corresponding zinc and cadmium compounds. Of the group II compounds the mercury organics are of considerable importance in view of the ease of formation and transformation. The magnesium and mercury organometallics are particularly important since they are useful to prepare other products, including other metal derivatives. The magnesium derivative can be obtained by reaction of the corresponding sodium derivative of a dicyclopentadienyliron with a magnesium halide such as magnesium iodide. The sodium compound is a useful intermediate for the preparation of organic derivatives.

The compounds of this invention are particularly useful as antiknock agents in spark ignition engines. They can also be used as catalysts and reactants in organic reactions. Some of the compounds, particularly the mercury compounds, are useful in pesticidal and fungicidal applications.

As many apparently widely different embodiments of this invention may be made without departing from the spirit and scope thereof, it is to be understood that this invention is not limited to the specific embodiments thereof except as defined in the appended claims.

I claim:

1. An organometallic compound wherein a metal of group VIII of the periodic table is bonded directly to nuclear carbon of two five-membered carbocyclic radicals which are entirely hydrocarbon and each of which contains the cyclopentadiene ring as its nucleus and wherein at least one of said carbocyclic radicals also is bonded directly through nuclear carbon thereof to a metal selected from the class consisting of alkali metals and metals of group II having an atomic number not exceeding 80, and the remaining valence of said group II metal is bonded to an anion.

2. An organometallic compound wherein a metal of the first period of group VIII of the periodic table is bonded directly to nuclear carbon of two five-membered carbocyclic radicals which are entirely hydrocarbon and each of which contains the cyclopentadiene ring as its nucleus with at most two monovalent hydrocarbon substituents thereon and wherein at least one of said carbocyclic radicals also is bonded directly through nuclear carbon thereon to an alkali metal.

3. An organometallic compound as set forth in claim 2 wherein said alkali metal is sodium.

4. An organometallic compound wherein a metal of the first period of group VIII of the periodic table is bonded directly to nuclear carbon of two five-membered carbocyclic radicals which are entirely hydrocarbon and each of which contains the cyclopentadiene ring as its nucleus with at most two monovalent hydrocarbon substituents thereon and wherein at least one of said carbocyclic radicals also is bonded directly through nuclear carbon thereof to a metal of group II having an atomic number not exceeding 80, and the remaining valence of said group II metal is bonded to an anion.

5. An organometallic compound as set forth in claim 4 wherein said metal of group II having an atomic number not exceeding 80 is mercury.

6. An organometallic compound wherein a metal of the first period of group VIII of the periodic table is bonded directly to nuclear carbon of two unsubstituted cyclopentadienyl radicals and wherein at least one of said cyclopentadienyl radicals also is bonded directly through nuclear carbon thereof to an alkali metal.

7. An organometallic compound as set forth in claim 6 wherein said alkali metal is sodium.

8. An organometallic compound wherein a metal of the first period of group VIII of the periodic table is bonded directly to nuclear carbon of two unsubstituted cyclopentadienyl radicals and wherein at least one of said cyclopentadienyl radicals also is bonded directly through nuclear carbon thereof to a metal of group II having an atomic number not exceeding 80, and the remaining valence of said group II metal is bonded to an anion.

9. An organometallic compound as set forth in claim 8 wherein said metal of group II having an atomic number not exceeding 80 is mercury.

10. An organometallic compound wherein iron is bonded directly to nuclear carbon of two five-membered carbocyclic radicals which are entirely hydrocarbon and each of which contains the cyclopentadiene ring as its nucleus with at most two monovalent hydrocarbon substituents thereon and wherein at least one of said carbocyclic radicals also is bonded directly through nuclear carbon thereon to an alkali metal.

11. An organometallic compound wherein iron is bonded directly to nuclear carbon of two unsubstituted cyclopentadienyl radicals and wherein at least one of said cyclopentadienyl radicals also is bonded directly through nuclear carbon thereof to an alkali metal.

12. An organometallic compound wherein iron is bonded directly to nuclear carbon of two five-membered carbocyclic radicals which are entirely hydrocarbon and each of which contains the cyclopentadiene ring as its nucleus with at most two monovalent hydracarbon substituents thereon and wherein at least one of said carbocyclic radicals also is bonded directly through nuclear carbon thereof to a metal of group II of the periodic table having an atomic number not exceeding 80, and and the remaining valence of said group II metal is bonded to an anion.

13. An organometallic compound wherein iron is bonded directly to nuclear carbon of two unsubstituted cyclopentadienyl radicals and wherein at least one of said cyclopentadienyl radicals also is bonded directly through nuclear carbon therof to a metal of group II of the periodic table having an atomic number not exceeding 80, and the remaining valence of said group II metal is bonded to an anion.

14. An organometallic compound wherein iron is bonded directly to nuclear carbon of two five-membered carbocyclic radicals which are entirely hydrocarbon and each of which contains the cyclopentadiene ring as its nucleus with at most two monovalent hydrocarbon substituents thereon and wherein at least one of said carbocyclic radicals also is bonded directly through nuclear carbon thereof to mercury, and the remaining valence of said mercury is bonded to an anion.

15. An organometallic compound wherein iron is bonded directly to nuclear carbon of two unsubstituted cyclopentadienyl radicals and wherein at least one of said cyclopentadienyl radicals also is bonded directly through nuclear carbon thereof to mercury, and the remaining valence of said mercury is bonded to an anion.

16. An organometallic compound as set forth in claim 10 wherein said alkali metal is sodium.

17. An organometallic compound as set forth in claim 11 wherein said alkali metal is sodium.

18. Bis(sodiumcyclopentadienyl)iron.

19. Acetoxymercuricyclopentadienyl(cyclopentadienyl)iron.

20. Bis(acetoxymercuricyclopentadienyl)iron.

21. An organometallic compound as set forth in claim 2 wherein said alkali metal is lithium.

22. An organometallic compound as set forth in claim 6 wherein said alkali metal is lithium.

23. An organometallic compound as set forth in claim 10 wherein said alkali metal is lithium.

24. An organometallic compound as set forth in claim 11 wherein said alkali metal is lithium.

25. Cyclopentadienyl(lithiumcyclopentadienyl)iron.

References Cited in the file of this patent

UNITED STATES PATENTS

| | | |
|---|---|---|
| 2,680,756 | Pauson | June 8, 1954 |
| 2,680,758 | Thomas | June 8, 1954 |
| 2,683,157 | Weinmayr | July 6, 1954 |

OTHER REFERENCES

Thiele: Ber., vol. 24, pp. 68 and 69 (1901).

Kealy and Pauson: Nature 168, 1039 (1951).

Sidgwick: Chemical Elements and Their Compounds, vol. 1, page 72, Oxford Univ. Press (1951).

Woodward et al.: J. Am. Chem. Soc., vol. 74, p. 3458 (1952).

Wilkinson: J. A. C. S., vol. 74, page 6148, December 5, 1952.

Fischer et al.: Zeitschrift fur Naturfarschung, vol. 8, #1, pp. 1 and 2, January (1953).